H. H. BOYCE.
FASTENING MEANS FOR INSTRUMENT GLASSES AND THE LIKE.
APPLICATION FILED APR. 19, 1918.

1,430,721. Patented Oct. 3, 1922.

INVENTOR
Harrison H. Boyce
BY
Edmund Quincy Moses
his ATTORNEY

Patented Oct. 3, 1922.

1,430,721

UNITED STATES PATENT OFFICE.

HARRISON H. BOYCE, OF FOREST HILLS, NEW YORK.

FASTENING MEANS FOR INSTRUMENT GLASSES AND THE LIKE.

Application filed April 19, 1918. Serial No. 229,582.

*To all whom it may concern:*

Be it known that I, HARRISON H. BOYCE, a citizen of the United States, residing at Forest Hills, in the county of Queens and State of New York, have invented certain new and useful Improvements in Fastening Means for Instrument Glasses and the like, of which the following is a specification.

This invention relates to means for fastening in position the glasses or crystals of instruments, or for fastening plates, especially fragile plates, for other like purposes, and its object is the provision of a simple and inexpensive construction by which such glasses may be firmly and securely retained in position without danger of breaking the glass. The invention is especially adapted for securing glasses or plates having beveled edges.

For the purpose of illustrating the principle of my invention and the manner of performing the same I have shown one specific embodiment of the invention as applied to a temperature indicating instrument for vehicle engines of the character set forth in my application for Patent Serial No. 726,270, filed October 17th, 1912, Patent No. 1,275,654. It is to be understood, however, that the invention is not limited to use in connection with instrument of this character but may be employed wherever a glass crystal or lens or other similar plate or disk is to be secured in position.

Figure 1:
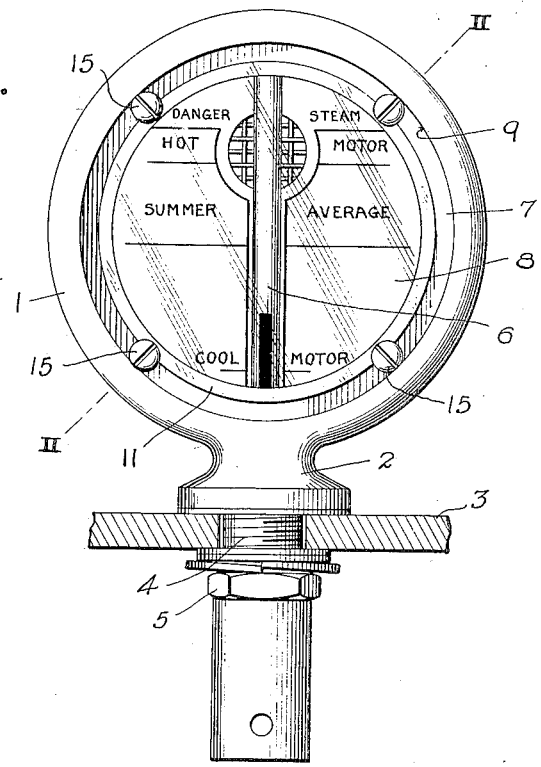
Figure 2:
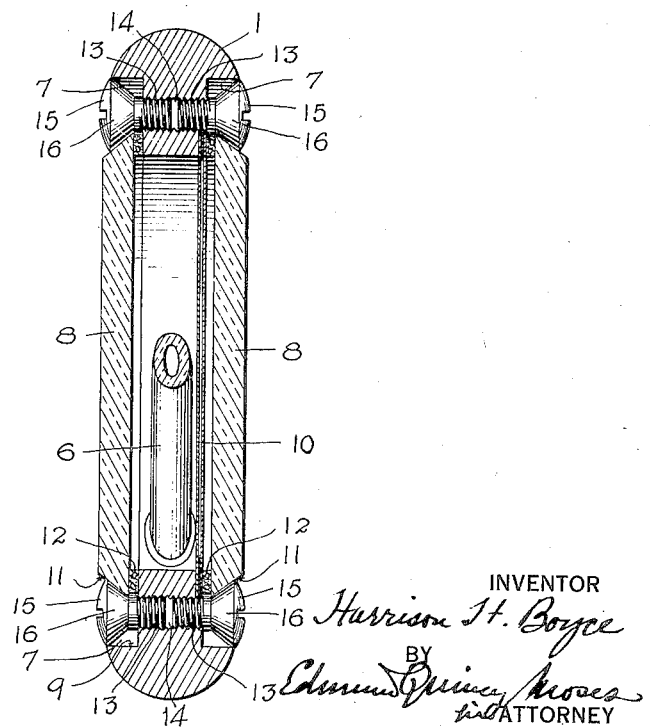

In the accompanying drawings which form a part of this specification Figure 1 is a front view of an instrument of the character referred to having the invention applied thereto, Figure 2 is a section on line II—II of Figure 1 on an enlarged scale.

Referring to the drawings in detail the numeral 1 designates the frame of the instrument which is usually made of metal and which is illustrated as of annular form. This frame is provided with a base 2 adapted to rest upon the radiator cap or other part to which the instrument is to be attached, the instrument having depending from it a stem 4 which projects through a hole in the cap and carries a nut 5 for clamping the instrument in position. Mounted in the stem and projecting diametrically across the annular frame is a glass thermometer 6. The frame 1 is provided in one or both faces with recesses 7 in which are mounted the instrument glasses or crystals 8. The outer walls 9 of the recesses form abutments for the heads of the attaching screws as will be hereinafter described. In the recess in rear of the thermometer tube a dial 10 is preferably mounted.

The edges of the glasses or crystals 8 are beveled as at 11 and the glasses are preferably seated on resilient washers 12 of cork, paraffin paper or other suitable material interposed between the surfaces of the glass and the bottom surfaces of the recesses. The use of such resilient washers is not, however, in all cases, essential. For securing the glasses in position attaching screws 13 are provided which screw into holes 14 in the instrument frame. The screws are provided with heads 15 having beveled or conical surfaces 16 which preferably have the same inclination as the beveled edges 11 of the glass so that such heads fit snugly against and in contact with such edges. The diameter of the screw heads is preferably such that when the screws are screwed up tightly the outer peripheral portions of the heads will bear against the outer walls 9 of the recesses which form supporting abutments for the screw heads, thereby preventing the latter from being wedged laterally so as to bend and possibly break the screws through the engagement of the heads with the beveled edges 11 of the glasses.

Owing to the mode of engagement of the conical screw heads with the beveled edges of the glasses I find that it is possible to turn up the screws as tightly as may be desired without danger of cracking or chipping the glass. A very firm and tight mounting of the glass is thus secured in a simple, inexpensive and attractive manner, no bezels, retaining rings or other special glass holding or attaching devices being required. I find that in most cases the glass is more firmly held in position by the screw heads in the manner described, than is the case where bezels or glass engaging rings are employed. There is practically no danger of the glass becoming loosened by vibration, an important advantage in an instrument intended for use on a vehicle or in connection with an engine.

It will be understood that conical headed members held in position in any suitable manner may be utilized in place of the conical headed screws.

While I have described in detail only one specific embodiment of my invention I realize that the invention may be carried out in various other ways and I do not therefore intend to limit myself to such specific embodiment but desire to cover my invention in whatever form its principle may be utilized.

Having thus described my invention I claim:

1. In an instrument construction, the combination of a support, a crystal of frangible material having a flat surface engaging said support and having a beveled edge turned away from said support, and means for holding said crystal in co-operative relation to said support comprising a plurality of screws carried by said support outside of the periphery of said crystal and having conical heads of substantially the same inclination as the angle of the beveled edge of the crystal and directly engaging the latter.

2. In an instrument construction, the combination of a support having a circular recess therein, a crystal of frangible material having a diameter less than the diameter of said recess and having a flat surface engaging with the bottom of said recess and a beveled edge turned away from the bottom of said recess, and means for holding said crystal in co-operative relation with said support comprising a plurality of screws carried by said support just outside of the periphery of said crystal, said screws having conical heads which engage both the beveled edge of the crystal and the wall of the recess in said supporting member.

HARRISON H. BOYCE.